Jan. 25, 1966   J. O. MOORHEAD   3,231,717
ELECTRICALLY HEATED VESSEL AND DETACHABLE
TEMPERATURE-REGULATING
CONNECTOR THEREFOR
Filed Nov. 15, 1963   4 Sheets-Sheet 1
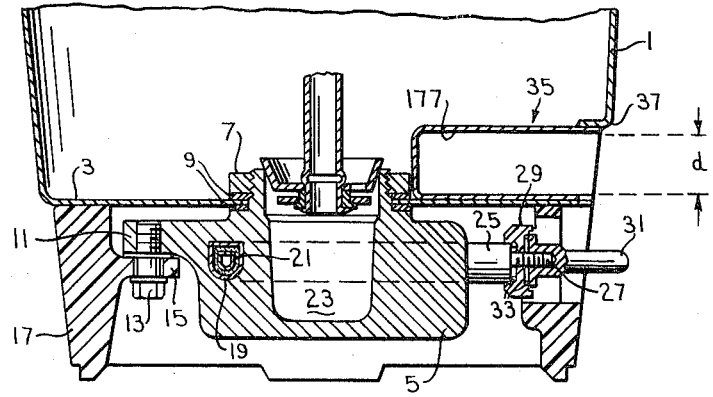
FIG.1.
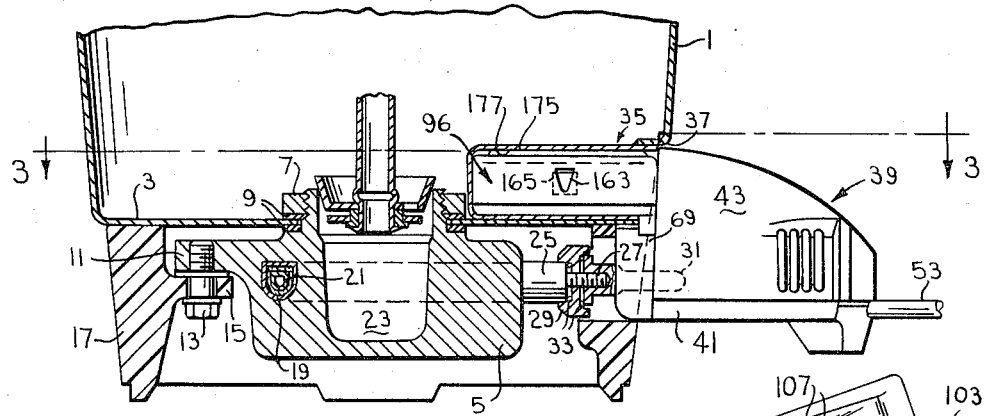
FIG.2.
FIG.15.
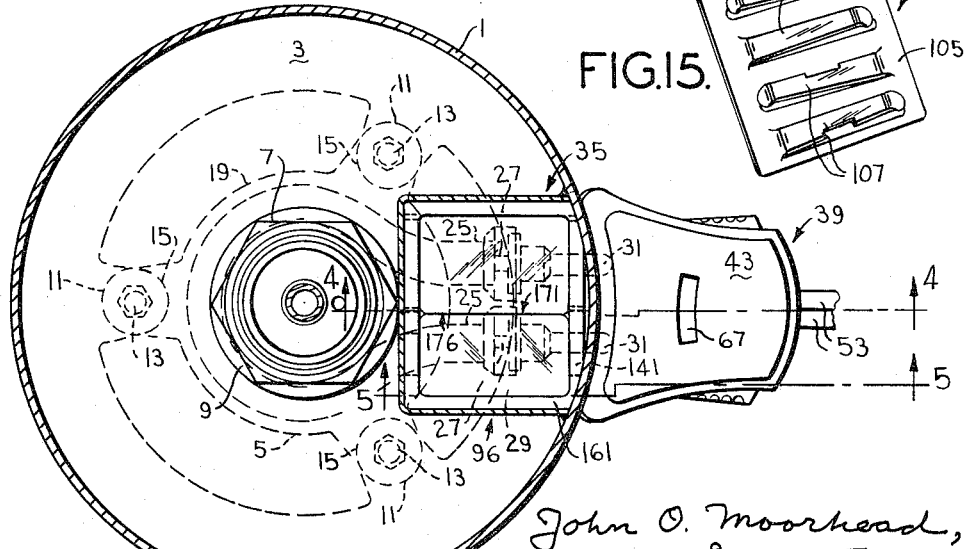
FIG.3.
John O. Moorhead,
Inventor.
Koenig, Pope, Senniger and Powers,
Attorneys.

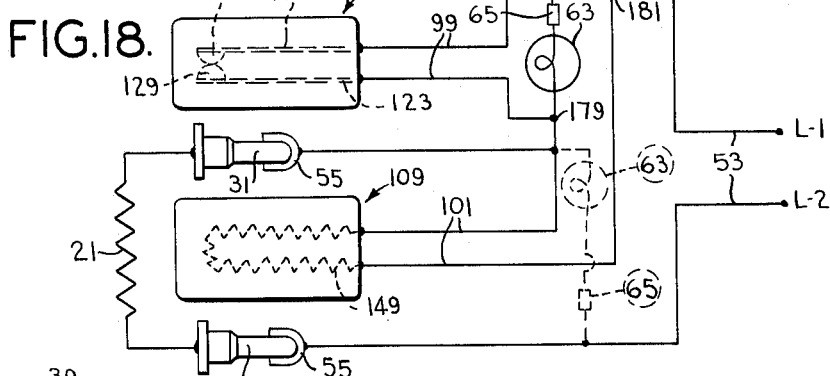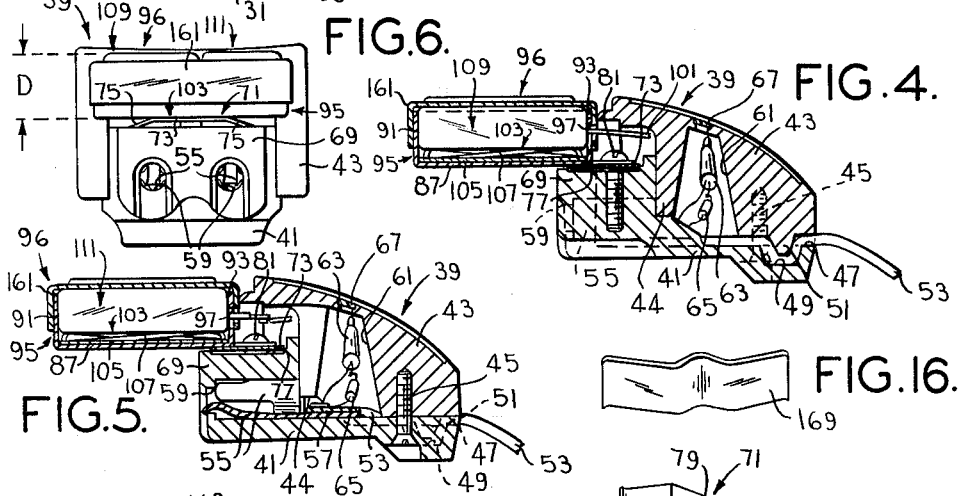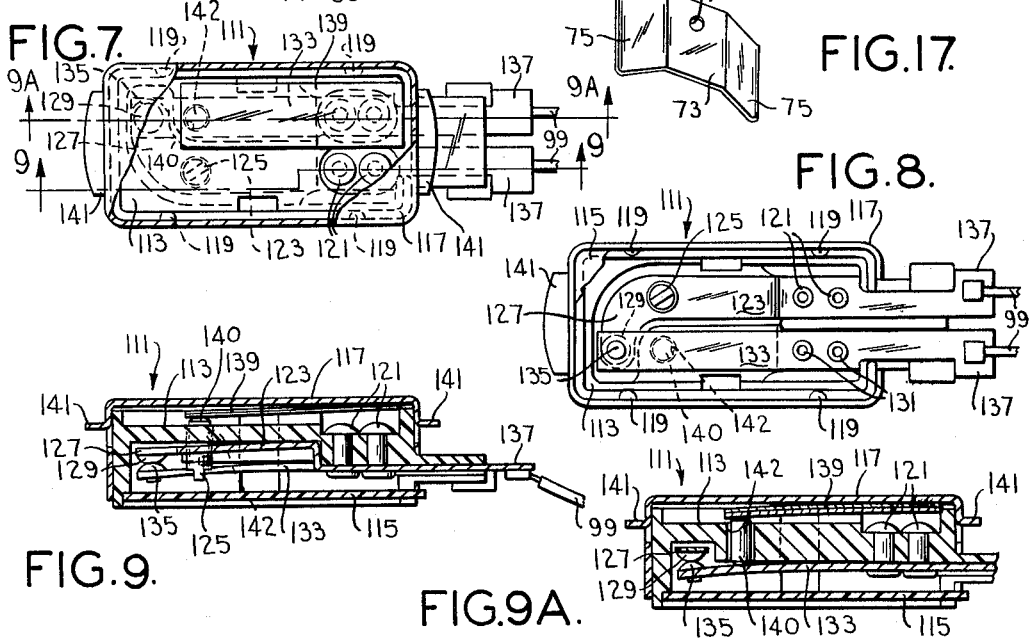

Jan. 25, 1966  J. O. MOORHEAD  3,231,717
ELECTRICALLY HEATED VESSEL AND DETACHABLE
TEMPERATURE-REGULATING
CONNECTOR THEREFOR
Filed Nov. 15, 1963  4 Sheets-Sheet 3
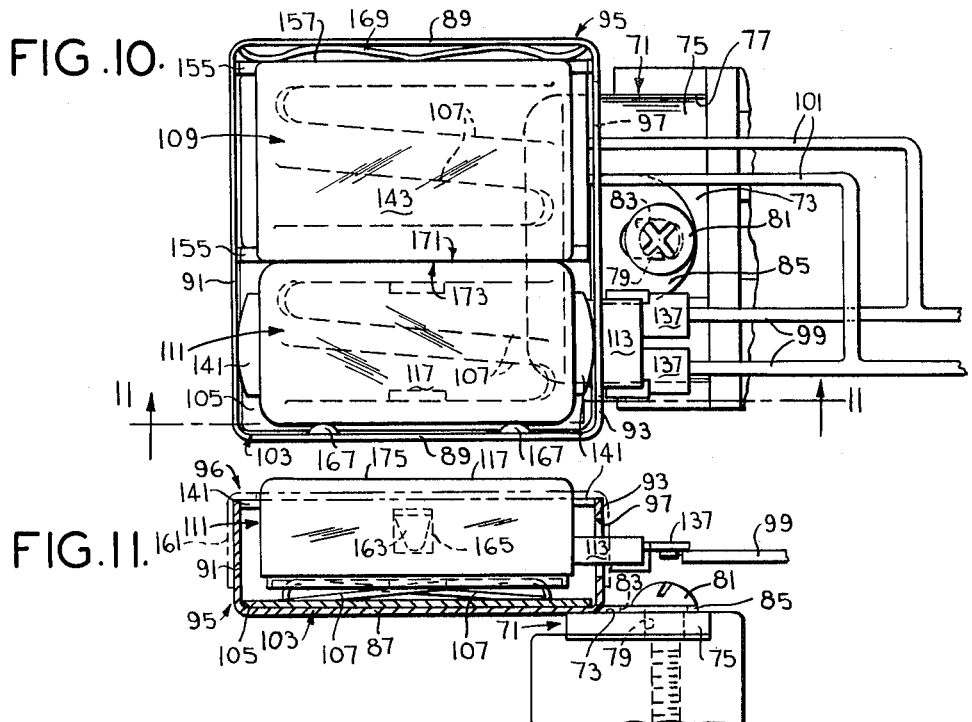
FIG.10.
FIG.11.
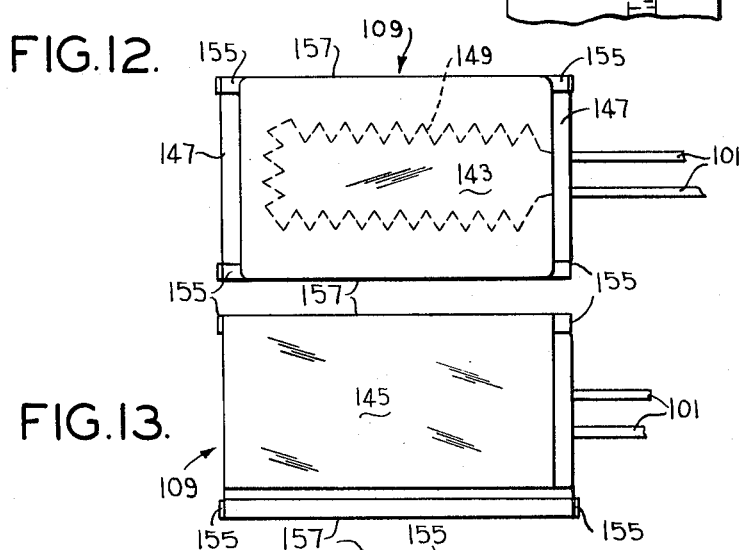
FIG.12.
FIG.13.
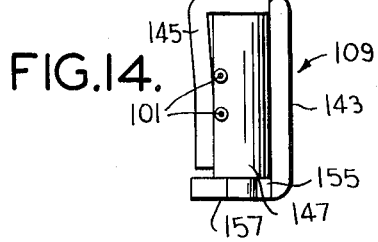
FIG.14.

Jan. 25, 1966     J. O. MOORHEAD     3,231,717
ELECTRICALLY HEATED VESSEL AND DETACHABLE
TEMPERATURE-REGULATING
CONNECTOR THEREFOR
Filed Nov. 15, 1963     4 Sheets-Sheet 4
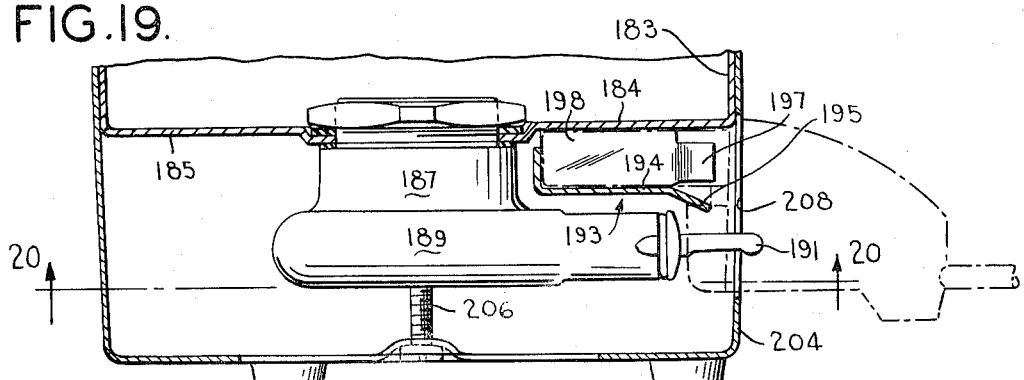
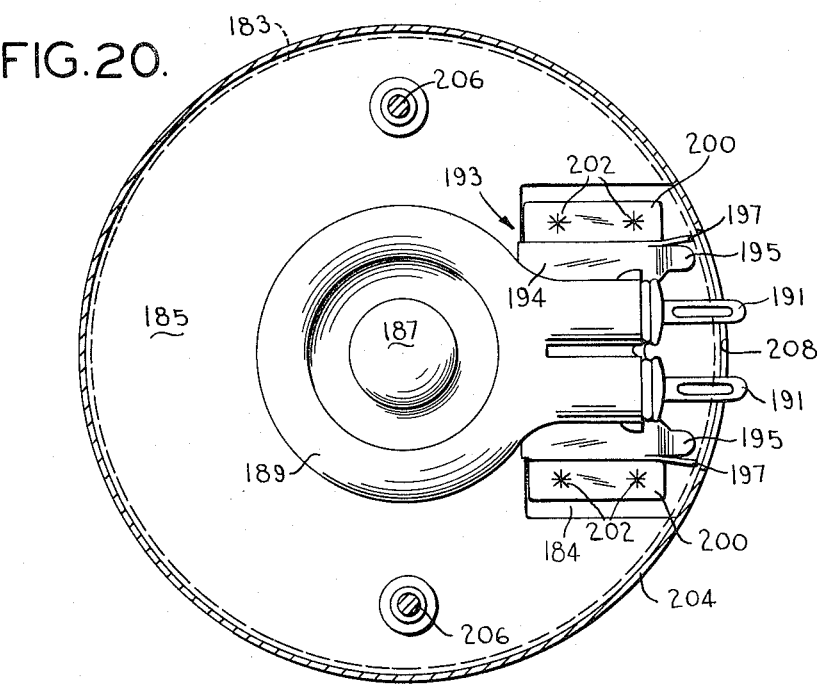
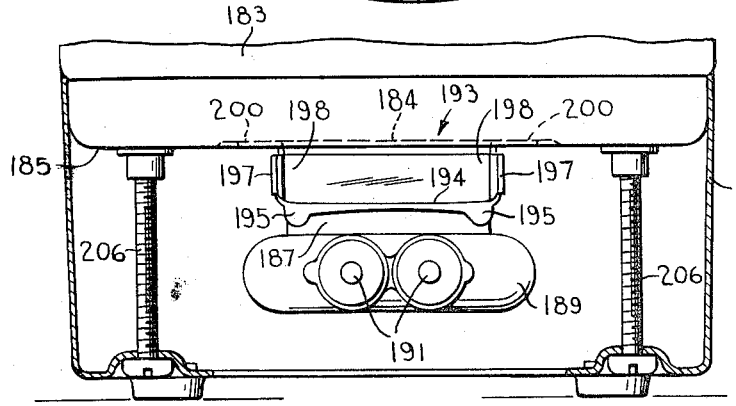

United States Patent Office 3,231,717
Patented Jan. 25, 1966

3,231,717
ELECTRICALLY HEATED VESSEL AND DETACHABLE TEMPERATURE-REGULATING CONNECTOR THEREFOR
John O. Moorhead, Lexington, Ky., assignor to Texas Instruments Incorporated, Dallas, Tex., a corporation of Delaware
Filed Nov. 15, 1963, Ser. No. 324,024
31 Claims. (Cl. 219—441)

This invention relates to electrically heated immersible or other vessels and detachable temperature-regulating connectors therefor, and with regard to certain more specific features, to such apparatus for heating substances such as coffee or the like, requiring a heating cycle for percolation or the like and then a keep-warm condition.

Among the several objects of the invention may be noted the provision of low-cost thermostatic control means adapted for more effective and reliable heat transfers between the thermostatic elements, the heater elements and the substance in the vessel to be heated; the provision of apparatus of the class described adapted to prolong the life of its components; the provision of a plug component having improved structural elements designed for improved heat-transfer functions and also for flexibility in physical application to and use with vessels of appropriate form but which may have dimensional differences due to manufacturing tolerances; and the provision of means of the class described which will effect percolation of a brew and then hold it warm without repercolation during holding and pouring operations employed in normal use of the vessel. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which one of various possible embodiments of the invention is illustrated, FIG. 1 is a vertical section of the lower portion of one form of immersible electrical coffee maker, showing in section a new heat-transfer receptacle component of the invention from which a new electrical control plug component of the invention has been removed;

FIG. 2 is a view similar to FIG. 1, showing the plug component applied to the vessel with a heat-transfer part of it in said heat-transfer receptacle;

FIG. 3 is a horizontal section taken on line 3—3 of FIG. 2;

FIGS. 4 and 5 are vertical sections of the plug taken on lines 4—4 and 5—5, respectively, of FIG. 3;

FIG. 6 is a left-hand end view of each of FIGS. 4 and 5;

FIG. 7 is a top plan view of a thermostatic switch assembly, parts being broken away to show interior parts;

FIG. 8 is a bottom plan view of FIG. 7, parts being removed to show certain thermostatic switch parts;

FIG. 9 is a longitudinal section taken on line 9—9 of FIG. 7;

FIG. 9A is an enlarged fragmentary section taken on line 9A—9A of FIG. 7;

FIG. 10 is an enlarged plan view of a combined switch and heater probe, a bezel part being removed;

FIG. 11 is a vertical section taken on line 11—11 of FIG. 10, the assembled position of the bezel being shown in broken lines;

FIG. 12 is a plan view of a heater assembly;

FIG. 13 is a bottom view of the heater assembly;

FIG. 14 is a right end view of the heater shown in FIG. 12;

FIG. 15 is a perspective view of a spring used in the probe;

FIG. 16 is a perspective view of another spring used in the probe;

FIG. 17 is a perspective view of a spring employed for mounting the probe in a housing;

FIG. 18 is a wiring diagram in which one connection for a signal lamp is shown in solid lines and an alternate connection for this signal lamp is shown in dotted lines;

FIG. 19 is a fragmentary cross section of the bottom portions of another form of coffee maker to which the plug portions of the invention are applicable, as shown by the broken lines;

FIG. 20 is a bottom plan view of FIG. 19, without the broken lines; and

FIG. 21 is a fragmentary right side elevation of FIG. 19, without the broken lines.

Corresponding reference characters indicate corresponding parts throughout the several views of the drawings.

There are known various types of coffee makers or pots employing electrical heating elements which have main heating elements which are immersible for cleaning purposes. Each main heating element in such a pot has two extending male terminal pins for accepting female terminals of an electric power plug, the plug usually carrying thermostatic control means and an auxiliary heater. The thermostatic control means is adapted to connect the auxiliary heater in series with the main heater after a brewing or percolating event. This reduces the heating effect of both heaters so as to keep the coffee warm. An intended function of the auxiliary heater was to hold the main thermostat open against cycling action which would otherwise reinstate an undesirable percolating event. This function has not reliably been performed. By means of the present invention heat-transfer functions are improved so as reliably to prevent repercolation during the hold warm period. The improvements are also carried out in a more flexible and reliable structure for application to and removal from coffee makers which, due to manufacturing tolerances, may vary somewhat dimensionally.

It is to be understood that the invention, while illustrated as being applicable to a percolating type of coffee maker, is not limited to such applications and is applicable to any vessels in which similar problems are involved.

Referring now more particularly to FIG. 1 of the drawings, there is shown at numeral 1 the liquid-containing vessel of a percolating type of coffee maker. Attached in an opening in its bottom 3 is a so-called percolating pump well part 5, held in place by a nut 7. Numeral 9 indicates sealing gaskets. The pump part 5 has ears 11 attached by bolts 13 to ears 15 of a base 17. Cast or otherwise inserted in the pump part 5 is a heater jacket 19, within which is an insulated main heater 21. This heater is formed to surround the well recess 23 of the pump well part 5 and is of sufficient wattage when connected to a normal 115 v. circuit to bring about percolation in a reasonable time. Ends 25 of the jacket 19 extend from the part 5.

A threaded heater terminal such as shown at 27 extends from each jacket end 25. Fitting over each jacket end 25 is a bushing 29, and threaded to each terminal 27 is a terminal pin 31. Gaskets 33 seal off the ends 25, so that upon immersion no water will reach the heater 21. At numeral 35 is shown a probe-receiving receptacle attached as by welding to the bottom 3 and around an opening 37 in the vessel 1. This receptacle 35 is preferably of horizontally flatwise form so that its upper wall presents a large area for heat conduction. Also, the bottom wall of receptacle 35 presents a face for the reception of heat from the heater 21 under said bottom 3. FIGS. 19-21 describe another useful form of vessel with attached receptacle but its details will be described later.

Referring to FIGS. 2, 3 and 4-6, numeral 39 identifies a detachable temperature-regulating connector or plug. This comprises insulating base and cover parts 41 and 43, held together by screws 45 to form a housing or casing. The base 41 includes a wire inlet portion 47 formed with a well 49 into which extends a lip 51 of the cover 43. The well 49 and lip 51 act to clamp lead-in wires 53. Each of these wires is attached to one of a pair of female conductive terminals 55, as by clinch means shown at 57. The terminals 55 are located in openings 59. The openings are in an upwardly extending part 69 of the base 41. They are on centers corresponding to the center distance between the terminal pins 31, so that they may be frictionally engaged and disengaged therewith. Hereinafter the terminal pins 31 will be referred to as a first pair of terminals and terminals 55 as a second pair of terminals.

The cover 43 is provided with a narrow downwardly extending tongue 44 providing an internal space 61 in which is located a glow lamp 63, along with a serially connected current limiter 65. These are connected across the terminals 99. Above the space 61 is a transparent window 67 through which it may be determined whether or not the lamp is lighted. The part 69 of base 41 serves as a platform support for a bowed leaf spring of the type shown at 71 in FIG. 17. This has a central portion 73 flanked by springy supporting legs 75. The upper portion of the extension 69 is formed as a socket 77, within which the legs 75 are confined. In the raised portion 73 is a hole 79 for accepting a shouldered holding screw 81. The shoulder of this screw, when in place, passes through an elongate opening 83 in a flat ear 85. This ear 85 forms an extension from the bottom 87 of a rectangular drawer-like box, indicated in general by the numeral 95, having side walls 89, a front end wall 91 and a rear wall 93. The rear wall 93 contains an opening 97 for the passage of thermostat wires 99 and auxiliary heater wires 101. The box 95 is a part of a heat-conductive thermostatic probe assembly indicated generally by numeral 96.

On the inside of the bottom of the box 95 is located a leaf-spring support 103, shown more in detail in FIG. 15. This consists of a plate 105 from which four spring tines 107 are struck up. Supported on two of the tines 107 is an auxiliary high-resistance heater assembly shown generally at 109; and on two others a thermostatic switch assembly shown at 111.

The thermostatic switch assembly 111 is detailed in FIGS. 7, 8, 9 and 9A. It comprises an insulating capsule 113 having a bottom 115. It is located in a metal cover 117. The cover is held in place on the capsule 113 by dimples 119 pressed into suitable recesses in the capsule. In the capsule 113 is a curved conductor bar 123, held by rivets 121. Through the bar is threaded an adjustment screw 125. At the curved end 127 of the bar 123 is a contact 129. The position of the contact 129 may be controlled by turning the screw 125, which reacts against the capsule 113 to deflect the bar 123. The bar is sufficiently resilient for the purpose.

Rivets 131 hold one end of a springy conductor strip 133 to the capsule 113. The other end of the strip 133 carries a contact 135. The outer ends of the bar 123 and conductor strip 133 are provided with tabs 137 for welding attachment of lead wires 99. The cover 117 has spot-welded on its inner side one end of a bimetallic strip 139 which functions as a thermostatic control. A transfer pin 140, passing through an opening 142 in the capsule 113, serves to transfer thermostatically induced motion from the bimetallic strip 139 to the switch conductor strip or blade 133. The contact 135 opens and closes with respect to contact 129 upon movement of the bimetal strip 139. By reason of the weldment between the bimetallic strip 139 and the metal cover 117, and the close association between strip 139 and cover 117, quick response to temperature differences applied to the cover 117 will be had. On the opposite ends of the cover are located lugs 141 for purposes to appear.

The heater assembly 109 (FIGS. 12-14) has a heat-conductive metal (for example aluminum) jacket 143 having a portion 145 and 157 enveloping an insulating body 147. The latter may be composed for example of ceramic. This insulation 147 contains a high-resistance heater wire 149. Lugs 155 extend from the side walls 157 of the jacket.

As the drawings show, both the heater assembly 109 and the thermostatic switch assembly 111 are of generally flat rectangular shape, so as more or less to infill the inside rectangular shape of the box 95. When inserted, the heater 109 and thermostat 111 are located on the spring 103, being biased upward against the holding action of the inner margins 159 of a bezel 161, said margins being engaged on their undersides by the lugs 141 on the thermostat 111, and the lugs 155 on the heater 109. The bezel itself is held down on the box 95 by indentations in its opposite sides which cooperate springly with detent openings in the side walls 89 of the box 95, as shown for example at 165 (FIG. 2). Thus the bezel is quick-attached and detachable, which is advantageous in assembly and in cases that repairs or adjustments might be required in assemblies 109 or 111. The bezel 161 serves to hold captive the upwardly biased heater and switch assemblies 109 and 111. For clarity, FIG. 10 shows the bezel as having been removed, and in FIG. 11 its position when attached is shown by broken lines.

As shown in FIG. 10, one side wall 89 of the box 95 is also inwardly dimpled as shown at 167. Against these dimples rest one side of the assembly 111. Adjacent the other side wall 89 of the box 95 is positioned a leaf spring such as shown at 169 (FIG. 16). This spring pushes against one side of the assembly 109, thus biasing it toward and against the assembly 111, resting on the dimples 167. Good heat-conductive interfacial contact is therefore made between adjacent flat heat-conductive walls of the heater assembly 109 and the thermostatic switch assembly 111, as shown at 171 and 173 (FIG. 10). In addition, the flat top surfaces 175 of both assemblies 109 and 111 (see FIG. 11) are adapted flatly to engage the bottom surfaces of the top of the receptacle 35, as shown in FIG. 2. The latter surface of the receptacle is numbered 177 in FIG. 2. The engagement is accomplished by upward pressure from spring 103.

In view of the above, it will be seen that the plug has in effect an extension therefrom in the form of the box 95, which with its bezel 161 holds captive the sprung assemblies 109, 111, which are springingly biased upward, so that the distance D (FIG. 6) is somewhat greater than the dimension d shown in FIG. 1. Thus there is in effect a resiliently mounted probe forming part of the connector plug 39, taken as a whole. This probe is adapted to be inserted into the receptacle 35 and to provide a good resiliently maintained heat-conductive surface contact between the inside surface of the top of the receptacle 35 and the flat tops of the spring-mounted auxiliary heater assembly 109 and the spring-mounted thermostatic assembly 111. In addition, these assemblies 109 and 111 are in good transverse heat-conductive contact between them at 171, 173. The probe as a whole, and its heater and switch components are all advantageously of rectangular form.

The mounting of ear 85 of the box 95 on the spring 71 provides for such universal compensating movements as may be required for any variations in positions of terminal pins 31 relative to the receptacle 35 on a given coffee maker. This occurs without destroying the improved resiliently maintained heat-conductive relationships between parts above mentioned. In this connection it will be seen that the probe 96 may move in a universal manner on the resilient spring 71. The purpose of the elongate form of the hole 83 in the ear 85 around the screw 81 is to permit some relative axial movements between probe 96 and remaining portions of the plug 39. The spring 71 provides for transverse rocking movements of the probe with respect to the housing assembly 39 while the elongate hole permits relative plane movements between the probe and the housing.

In FIG. 18 is shown a wiring diagram in which like numerals designate like parts.

Operation is as follows, assuming that there is a suitable conventional plug on the distant ends of the line wires 53 for making engagement with a power circuit, and that the female terminals are pushed onto the terminal pins 31 while the probe 96 is inserted into the receptacle 35. At this time the bimetal element 33 is cold and the contacts 129 and 135 closed. Current then flows from side L-1 of the circuit wires 53. It proceeds through the thermostatically controlled switch assembly 111 and then in series through the main heater 21 and to the side L-2 of the line. At this time the voltage on points 179 and 181 is the same, switch 129 and heater wire 149 being shunt connected, so that no current flows through the high-resistance wire 149 of the auxiliary heater assembly 109 or through the lamp 63. The water in the coffee maker then rises in temperature, during which time percolation occurs. The period of percolation to effect a desired strength of brew depends upon the setting of the thermostatic switch control screw 125.

At the end of a brewing cycle, the temperature of the brew will have risen, heat having been transferred through the receptacle 35 to the flat probe therein. This has heated the bimetal strip 139 and other parts of assembly 109, with the result that the contacts 129, 135 become separated as the bimetal strip 139 deflects. This places the high-resistance warming heater coils 149 in series with the main heater, the lamp 63 being placed under voltage. Thus there is maintained a low, constant-current input for warming which, without percolating the brew, keeps it warm. The lighted lamp signals the hold-warm condition. Since the heater assembly 109 is in close heat-conductive contact at surfaces 171, 173 with the thermostatic switch assembly 111, the contacts 129, 135 of the latter are held open to prevent recycling and thus prevent further percolation or brewing. To terminate the warming action, the plug 39 is pulled from the terminal pins 31, which withdraws the probe 96 from the receptacle 35. Contact with the pins 31 is lost before the probe comes out of the receptacle. The vessel may then be emptied and cleaned. It may be mentioned that there is sufficient thermal mass in the auxiliary heater 109 to prevent the thermostat 139 from returning the switch contacts 129, 135 to closed position for a period of approximately five minutes, even after removal of the connector 39 as a whole from the vessel 1. This has the advantage that the controls may be temporarily removed from the vessel for a period of five minutes or less and then returned, to permit pouring without initiating another undesired percolating cycle.

While the signal lamp 63 is shown in solid lines in FIG. 18 as being connected into the circuit so as to light under the hold-warm condition, it will be understood that it could also be connected to go out under the hold-warm condition, as by placing it and the current limiter 65 according to the arrangement shown in dotted lines in FIG. 18, instead of in the solid-line position.

In FIGS. 19-21 is shown another typical form of coffee pot base, in connection with which the invention is effective. Such a pot comprises a vessel 183 having a more or less flat circular metal bottom 185 provided with a pump well part 187 like part 5 of FIG. 1, having a portion 189 containing a circular main heater, not shown, but like heater 21. Connected with the heater and extending from part 189 are pins 191 for the reception of the female terminals 55 already mentioned.

Attached beneath an offset part 184 of the bottom 185 is a bracket 193, which is in the form of a guide, preferably of rectangular shape, snugly to receive the rectangularly formed probe assembly 96. This box-shaped bracket 193 is of such shape that the probe assembly 96 slides into it as would a rectangular drawer. The outer or front portion of the pocket-forming bracket 193 is open. It has flared guide tongues 195 on its bottom 194 and transverse guide tongues 197 on its sides 198. These tongues aid in guiding the assembly 96 into the pocket formed by the bracket 193 at the time that the female terminals 55 are pushed to engage the pins 191. Extending from the sides 198 are tongues 200 spot-welded to the bottom part 184, as shown at 202. It will be apparent that in this form of the invention the top conductive surfaces of the heater assembly 109 and of the switch assembly 111 springingly contact the underside of the bottom part 184. Thus a good heat-conductive contact is made with the substantially flat metal bottom of the vessel. Numeral 204 indicates a bottom support for the vessel held in place by screws 206. Support 204 has a front opening 208 providing access to the bracket 193.

Operation of this form of the invention is like that already described above.

In view of the above, it will be seen that the several objects of the invention are accomplished, namely:

(1) The provision of the improved horizontal disposition of the receptacle 35 or bracket 193 in connection with vessel 1, together with the horizontally flatwise rectangular form of the probe 96 and its heater and switch, the shapes of which present large heat-flow areas to and from the contents of the vessel 1 and the parts of the probe.

(2) The resilient mountings for the auxiliary heater assembly 109 and the thermostatic switch assembly 111 in the probe, whereby first they are forced into good heat-conductive contact with wall 35 or 184, and whereby second the heater and the thermostatic switch are also transversely pressed into good interfacial heat-conductive contact between them.

(3) The probe has resilient universal compensating movements relative to the remaining portions of the plug 39, so that expected dimensional manufacturing differences of terminal pins 31 and receptacle 35 on various receptacles will be compensated for. This compensation is effected without destroying the above-mentioned good resiliently maintained heat-conductive interfacial contacts.

(4) Factory adjustments of brew strength may be accomplished at the screw 135. Access to assemblies 109 and 111 is had by removing the bezel 161. This permits repairs to be made on them, or their replacement. Their removal may readily be accomplished by snapping the bezel 161 from the box 95. Other repairs may be made to parts within the connector housing by removal of the screws 45 and separation of the housing members 41 and 43.

(5) The attachment of the bimetallic blade 139 to the metallic top 117 of the assembly 111, after which rapid response to changing temperatures occurs, whether the device be used in a coffee pot such as illustrated in FIGS. 19-21 or the one shown in FIGS. 1-3.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Heat control means for a substance to be heated, comprising a vessel for containing said substance, said vessel including a wall portion engaged by its contents, at least some area of which wall portion is heat-conductive, a main electric heater for said contents, said heater having a first pair of electric terminals, recess-forming means of which said heat-conductive area forms a part, an electric connector including a casing carrying a second pair of electric terminals for engaging said first pair of terminals, a probe assembly including holding means having an open top, said holding means extending from said casing and adapted to be moved into said recess-forming means when said first and second pairs of terminals are engaged, an auxiliary heater and a thermostatic switch, each having a heat-conductive casing and forming part of the probe assembly, both of said heater and thermostatic switch being resiliently mounted in said holding means for direct heat-exchange contact therebetween and for direct heat-exchange contact through said open top with said heat-conductive area when the probe assembly is in said recess-forming means, and circuit means including line wires in the connector for connecting said main heater across said line wires when the thermostatic switch is closed and connecting said main and auxiliary heaters in series across said line wires when said thermostatic switch is open.

2. Heat control means according to claim 1, wherein said heat-conductive wall area is substantially flat and said recess-forming means and probe assembly have substantially flatwise forms.

3. Heat control means according to claim 2, wherein said flatwise forms are substantially rectangular.

4. Heat control means according to claim 3, wherein said heat-conductive substantially flat wall area is substantially horizontally disposed, and the substantially flatwise rectangular forms of the recess-forming means and probe assembly are horizontally disposed when the probe assembly is located in said recess-forming means.

5. Heat control means according to claim 1, wherein said heat-conductive area is formed by a part of the bottom of the vessel and said recess-forming means is located below said last-named part.

6. Heat control means according to claim 5, wherein said recess-forming means is in the form of a bracket under said bottom, said bracket forming guide means for the guided insertion therein of said probe assembly.

7. Heat control means according to claim 1, wherein said recess-forming means is located above the bottom of the vessel.

8. Heat control means according to claim 1, wherein said recess-forming means is at some distance above said first pair of terminals and said probe assembly is located substantially the same distance above said second pair of terminals on the connector.

9. Heat control means according to claim 1, wherein said heater and thermostatic switch means are also mounted in close heat-exchange juxtaposition relative to one another.

10. Heat control means for a substance to be heated, comprising a vessel for containing said substance, said vessel including a wall portion engaged by its contents, at least some area of which wall portion is heat-conductive and substantially horizontally disposed, a main electric heater for said contents, said heater having a first pair of electric terminals, recess-forming means of which said heat-conductive area forms a part and which is of substantially flatwise rectangular extent, an electric connector including a casing carrying a second pair of electric terminals for engaging said first pair of terminals, a substantially rectangular probe assembly having a box-shaped carrier with an open top and extending from an attachment to said casing and adapted to be moved into said recess-forming means when said first and second pairs of terminals are engaged, an auxiliary heater assembly and a thermostatic switch assembly in the carrier each assembly having a flatwise heat-conductive top surface and interengaging heat-conductive flatwise side surfaces, means resiliently mounting the auxiliary heater and switch assemblies in the carrier for biasing said side surfaces into direct contact and for biasing said top surfaces into direct contact with said heat-conductive area when the carrier is in said recess-forming means, means holding the auxiliary heater and switch assemblies captive in the carrier to prevent their movement from said carrier when it is withdrawn from the recess-forming means, and circuit means including line wires in the connector connecting said main heater across said line wires when the thermostatic switch is closed and connecting said main and auxiliary heaters in series across said line wires when said thermostatic switch is open.

11. Heat control means according to claim 10, wherein the attachment between said carrier and the casing is flexible for compensating movements therebetween.

12. Heat control means according to claim 10, wherein said holding means is in the form of a quick-detachable bezel on the open top of the carrier to provide access to the auxiliary heater and switch assemblies.

13. Heat control means according to claim 10, wherein the attachment between said carrier and the casing is flexible for compensating movements therebetween, and wherein said holding means is in the form of a quick-detachable bezel on the open top of the carrier to provide access to the auxiliary heater and switch assemblies.

14. Heat control means according to claim 1, wherein said vessel has a transverse substantially flat bottom forming said area and said recess-forming means is of flatwise aspect extending transversely.

15. Heat control means according to claim 14, wherein said area forms a top wall of said recess-forming means.

16. Heat control means for a substance to be heated, comprising a vessel to contain the substance, a main electric heater connected with the vessel, a first pair of terminals connected with said heater, a receiver connected with the vessel near a heat conducting wall of the vessel, an electric connector including a housing carrying a second pair of terminals engageable with said first pair of terminals, a probe assembly extending from said housing for movement into the receiver when said first and second pairs of terminals are engaged, said probe assembly including an auxiliary electric heating device, said probe assembly also including a switch device having a switch-operating thermostat to actuate the switch device when heated to a predetermined temperature, said heater device and said switch device having substantially flat heat-conductive faces, resilient mounting means for each of said devices, said heat-conductive faces adapted when the probe assembly is in said receptacle to be pressed by said resilient mounting means into physical heat-conductive engagement with said wall of the heat-conductive receptacle and circuit means including line wires in the connector connecting said main heater across said line wires when the switch device is closed and connecting said main heater and auxiliary heating device in series across said line wires when the switch device is open.

17. Heat control means for a substance to be heated, comprising a vessel having a substantially flat-bottom, a main electric heater below said bottom, a first pair of terminals connected with said heater, a hollow heat-conductive receptacle or flatwise shape formed in part by a portion of the vessel bottom, an electric connector including a housing carrying a second pair of terminals engageable with said first pair of terminals, a probe assembly of generally flatwise shape extending from said housing for location in said receptacle when said first and second pairs of terminals are engaged, said probe assembly including an auxiliary electric heating device and also a thermostatic switch device, said heater device and said switch device having flat-faced heat-conductive portions, resilient mounting means for each of said devices, said flat-faced heat-conductive portions adapted when the probe assembly is in said receptacle to be pressed by said resilient mounting means into physical heat-conductive engagement with said portion of the vessel bottom and circuit means including line wires in the connector connecting said main heater across said line wires when the switch device is closed and connecting said main heater and auxiliary heating device in series across said line wires when the switch device is open.

18. A detachable temperature-regulating connector for an electrically heated device comprising in combination a housing, a pair of terminals in said housing for engagement with cooperating terminals on said device, a container having a flexible connection with said housing, an electric heater assembly and a thermostatic switch assembly in said container, the container having an open top and said assemblies having a first pair of heat-conductive faces and having a second pair of adjacent sidewise faces shaped for substantial interfacial heat-conductive contact therebetween, resilient means in the container for pressing said assemblies into interfacial heat-conductive engagement and for biasing both of them outward relative to the open top of the container, means for limiting outward biasing movements of said assemblies from the container, and circuit means in the connector including connections across said pair of terminals in the housing and connecting the electric heater in shunt relationship with the thermostatic switch, said switch adapted to be opened by heat flow thereto from the device through the face of the switch assembly, said heater adapted to hold said switch open by heat flow from said electric heater assembly through said sidewise forces.

19. A detachable temperature-regulating connector according to claim 18, wherein said connection includes swiveling and spring mounting means.

20. A detachable temperature-regulating connector according to claim 19, wherein said flexible connection comprises a slotted ear on the container, a perforated leaf spring forming a support on the housing for said ear, and holding means passing through the slot of the ear and the perforation in the spring and anchored in the housing.

21. A detachable temperature-regulating connector according to claim 18, wherein said means for limiting the biasing movement of the heater and the thermostatic switch assemblies comprises extensions thereon, and a bezel having a quick-detachable connection with the container and having a rim engaging said extensions, whereby said faces of the heater and the thermostatic switch assemblies are exposed and deflectable.

22. A detachable temperature-regulating connector according to claim 21, wherein one portion of said resilient means comprises a spring plate on the bottom of the container having spring fingers engaging the bottoms of the heater and thermostatic switch assemblies, and wherein another portion of said resilient means is constituted by a leaf spring reacting transversely from one side of the container under the bezel against the heater and switch assemblies.

23. A detachable temperature-regulating connector for an electrically heated device comprising in combination an insulating housing, a pair of feed terminals in said housing for engagement with cooperating terminals on said device, a shallow open-topped box having a connection with said housing above said feed terminals, an electric heater assembly and a thermostatic switch assembly in said box, each having transverse lugs thereon, said assemblies having upper substantially coplanar heat-conductive faces and having adjacent sidewise coextensive flat faces for interfacial heat-conductive contact therebetween, and sidewise resilient means in the box for pressing said assemblies into sidewise interfacial heat-conductive engagement and resilient means on the bottom of the box for biasing said assemblies outward relative to the container opening, and means connected with the box engageable by said lugs to limit the bias movements relative to the opening, and circuit means in the connector including connections across said pair of feed terminals and connecting the electric heater in shunt relationship with the thermostatic switch, said switch adapted to be opened by heat flow thereto from the device through the force of the switch assembly, said heater adapted to hold said switch open by heat flow from said electric heater assembly through said sidewise forces.

24. A detachable temperature-regulating connector according to claim 23, wherein said connection is flexible.

25. A detachable temperature-regulating connector according to claim 24, wherein said flexible connection comprises a slotted ear on the container, a perforated leaf spring forming a support on the housing for said ear, and holding means passing through the slot of the ear and the perforation in the spring and anchored into the housing.

26. In combination, a vessel having a bottom for containing a substance to be heated, a main electric heater having a first pair of terminals both of which are under said bottom, a heat-conductive receptacle of flatwise shape also connected under said bottom but above said terminals, a temperature-regulating electric connector comprising a housing, a second pair of terminals in said housing for engagement with said first pair of terminals, an open-topped box of flatwise shape extending from the housing above said second pair of terminals to fit in said receptacle and extending from a connection with said housing, an auxiliary heater assembly and a thermostatic switch assembly in said box, said assemblies having upper substantially flat heat-conductive faces and having adjacent sidewise flat faces for interfacial heat-conductive contact therebetween, resilient means in the box for pressing said assemblies into interfacial heat-conductive engagement and for biasing both of them outward from the container opening to engage said bottom when the box is pushed therein and said pairs of terminals engaged, means limiting outward movements of the auxiliary heater and the switch assemblies from the box when the box is outside of said receptacle and said terminals are disengaged, and circuit means in the housing connecting the main heater and the switch in series-circuit relationship when the first and second terminals are engaged and the switch is closed, and connecting the auxiliary heater in series with the main heater when the switch is open.

27. A detachable temperature-regulating connector comprising in combination a housing, a pair of terminals in said housing, a container forming an extension from said housing, an electric heater assembly and a thermostatic switch assembly in said container, the container having an open top and said assemblies having a first pair of heat-conductive faces which are exposed through said open top for transfer of heat, said assemblies having a second pair of adjacent sidewise faces which are in substantial heat-conductive relation with one another within said extension for transfer of heat therebetween, circuit means in the connector including connections across said pair of terminals in the housing and connecting the electric heater in shunt relationship with the thermostatic switch, whereby current may flow through the heater only when the switch is open, said thermostatic switch adapted to open in response to comparatively large heat flow thereto through the heat-conductive face of the switch assembly, said switch adapted to hold open in response to the sum of heat transferred thereto from said electric heater assembly plus a comparatively smaller heat flow transferred thereto through the exposed heat-conductive face of the switch assembly.

28. A connector made according to claim 27, including resilient means in the container for biasing said assemblies outward relative to the open top of the container, and means for limiting outward movements of the assemblies under bias.

29. A connector made according to claim 28, wherein said container has a flat rectangular shape and said heater and said switch assemblies therein also have substantially flat rectangular shapes.

30. A connector made according to claim 29 including resilient means connecting said extension with the housing.

31. A connector made according to claim 30, wherein the extension is located above and projects beyond the location of said terminals in the housing.

References Cited by the Examiner

UNITED STATES PATENTS

| 1,843,455 | 2/1932 | McGowen | 219—523 X |
| 2,541,321 | 2/1951 | Badger | 219—436 |
| 2,834,868 | 5/1958 | Greene et al. | 219—441 |
| 3,033,960 | 5/1962 | Geller | 219—510 X |
| 3,144,547 | 8/1964 | Price | 219—441 |

RICHARD M. WOOD, *Primary Examiner.*

ANTHONY BARTIS, *Examiner.*

UNITED STATES PATENT OFFICE
CERTIFICATE OF CORRECTION

Patent No. 3,231,717 January 25, 1966

John O. Moorhead

It is hereby certified that error appears in the above numbered patent requiring correction and that the said Letters Patent should read as corrected below.

Column 4, line 26, for "detachable" read -- detachable --; column 6, line 27, for "thet" read -- the --; column 8, line 65, for "or" read -- of --; column 9, line 4, after "bottom" insert a comma; column 10, line 5, for "force" read -- face --; line 8, for "forces" read -- faces --.

Signed and sealed this 17th day of January 1967.

SEAL)

Attest:

ERNEST W. SWIDER
Attesting Officer

EDWARD J. BRENNER
Commissioner of Patents